United States Patent
Bullock

[15] 3,679,696
[45] July 25, 1972

[54] METHOD OF PREPARING D1 6-PHENYL-2,3,5,6-TETRAHYDROIMIDAZO [2,1-B]-THIAZOLE HYDROCHLORIDE

[72] Inventor: Milon Walker Bullock, Hopewell, N.J.
[73] Assignee: American Cyanamid Company, Stamford, Conn.
[22] Filed: July 22, 1969
[21] Appl. No.: 843,847

Related U.S. Application Data

[60] Continuation-in-part of Ser. No. 669,704, Sept. 22, 1967, abandoned, which is a division of Ser. No. 493,231, Oct. 5, 1965, abandoned.

[52] U.S. Cl. .............................. 260/306.7, 260/454, 424/270
[51] Int. Cl. ............................................................. C07d 99/10
[58] Field of Search .......................................... 260/306.7

[56] References Cited

UNITED STATES PATENTS

| | | | |
|---|---|---|---|
| 3,169,970 | 2/1965 | Snyder | 260/306.7 |
| 1,915,334 | 6/1933 | Salzberg et al. | 260/243 |
| 2,075,359 | 3/1937 | Salzberg et al. | 424/250 |
| 2,425,320 | 8/1947 | Hill | 252/149 |
| 2,606,155 | 8/1952 | Hill | 252/149 |

FOREIGN PATENTS OR APPLICATIONS

| | | | |
|---|---|---|---|
| 34,860 | 12/1964 | Germany | 260/306.7 |

OTHER PUBLICATIONS

Dorn, Angfw. Chem., Vol. 76 (1964), p. 301

*Primary Examiner*—Alex Mazel
*Assistant Examiner*—R. J. Gallagher
*Attorney*—Ernest Y. Miller

[57] ABSTRACT

A method of preparing 6-phenyl-2,3,5,6-tetrahydroimidazo[2,1-b]thiazole hydrochloride by reacting styrene oxide with ethyleneimine in a polar solvent to produce $\alpha$-phenyl-1-aziridineethanol, treating this reaction product with thiocyanic acid and hydrochloric acid to obtain 2-imino-$\alpha$-phenyl-3-thiazolidineethanol hydrochloride and reacting the 2-imino-$\alpha$-phenyl-3-thiazolidineethanol hydrochloride with thionyl chloride to obtain dl 3-($\beta$-chlorophenethyl)-2-iminothiazolidine hydrochloride, treating this compound with aqueous alkali to obtain dl 3-($\beta$-chlorophenethyl)-2-iminothiazolidine free base, and isomerizing the latter compound in the absence of alkali to obtain dl 6-phenyl-2,3,5,6-tetrahydroimidazo [2,1-b]thiazole hydrochloride. The product is useful as an anthelmintic.

4 Claims, No Drawings

METHOD OF PREPARING D1 6-PHENYL-2,3,5,6-TETRAHYDROIMIDAZO [2,1-B]-THIAZOLE HYDROCHLORIDE

This application is a continuation-in-part of my application Ser. No. 669,704, filed Sept. 22, 1967, now abandoned, which in turn is a division of application Ser. No. 493,231, filed Oct. 5, 1965, now abandoned.

SUMMARY OF THE INVENTION

This invention relates to a method of preparing d1 6-phenyl-2,3,5,6,-tetrahydroimidazo[[2,1-b]thiazole hydrochloride, novel intermediates and methods of preparing the latter.

The d1 6-phenyl-2,3,5,6-tetrahydroimidazo[2,1-b]-thiazole hydrochloride prepared by the process of the present invention can be illustrated by the following formula:

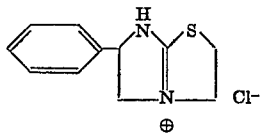

In accordance with the process of the present invention d1 6-phenyl-2,3,5,6-tetrahydroimidazo[2,1-b]thiazole hydrochloride is prepared by admixing, d1 3-($\beta$-chlorophenethyl)-2-iminothiazolidine hydrochloride with an alkali metal or alkaline earth metal hydroxide or carbonate in the presence of water and a water immiscible organic solvent such as chlorinated hydrocarbon, a lower alkyl ester or an alkylene halide, but preferably the latter, at about ambient temperature and separating the organic phase. Solvents which are suitable for use in this reaction are chloroform, ethyl acetate, methylene chloride and ethylene chloride. The organic phase of the thus formed reaction mixtures contains d1 3-($\beta$-chlorophenethyl)-2-iminothiazolidine free base. This free base can be recovered as such by evaporation of the solvent at or below ambient temperature or it can be converted directly in a single step to the d1 6-phenyl-2,3,5,6-tetrahydraimidazo[2,1-b]thiazole hydrochloride. In recovery of the free base evaporation is generally achieved under reduced pressure. If the solvent from the organic phase is not separated from the free base and the mixture is heated to between about 40° C. and 120° C. for a period of about 10 minutes to 3 hours, the d1 3-($\beta$-chlorophenethyl)-2-iminothiazolidine is converted to d1 6-(phenyl-2,3,5,6-tetrahydroimidazo[2,1-b]thiazole hydrochloride. This product can then be recovered from the reaction mixture by titration of the hydrochloride which crystallizes.

Alternatively the hydrochloride salt of d1 6-phenyl 2,3,5,6-tetrahydroimidazo[2,1e-b]thiazole can be obtained by a stepwise procedure involving (1) admixing d1 3-($\beta$-chlorophenethyl)-2-iminothiazolidine hydrochloride with an alkali metal or alkaline earth metal hydroxide or carbonate in water and a water immiscible organic solvent as described above, (2) separating the organic phase from the thus formed mixture, (3) separating the solvent from said mixture while maintaining the temperature thereof below about 40° C. to obtain d1 3-($\beta$-chloro-phenethyl)-2-iminothiazolidine free base, (4) dissolving the thus formed free base in a lower alkyl alcohol having from one to four carbon atoms and preferably selected from the group consisting of methanol and ethanol, (5) heating the thus formed solution from about 40° to 120° C. for about 10 minutes to 3 hours and (6) separating said lower alkyl alcohol from the hydrochloride salt of the product. In practice I have found that essentially optimum product yields can be obtained with this procedure when ethanol is employed as the solvent in step 4.

The d1 3-($\beta$-chlorophenethyl)-2-iminothiazolidine hydrochloride which is cyclized to final product as described above is prepared from the corresponding 2-imino-$\alpha$-phenyl-3-thiazolidineethanol hydrochloride salt by reaction with thionyl chloride, phosphorus trichloride or phosphorus oxychloride. The reaction is usually carried out by mixing the intermediate with the halogenating agent and heating the mixture to a temperature within range of 40° to 120° C. for 5 minutes to 4 hours.

The d1 2-imino-$\alpha$-phenyl-3-thiazolidineethanol is prepared as a salt by contacting $\alpha$-phenyl-1-aziridineethanol with at least one molar equivalent of thiocyanic acid followed by treatment with a strong acid such as hydrochloric acid. The thiocyanic acid is usually prepared in situ by the acidification of any ammonium or metal thiocyanate salt, preferably sodium or potassium thiocyanates.

The $\alpha$-phenyl-1-aziridineethanol can be prepared by a reaction of styrene oxide with ethyleneimine as described by Funke et al. Bull. Soc. Chim., France, 1953 (12013).

The process of the present invention starting with known reactants can be illustrated by the following flowsheet.

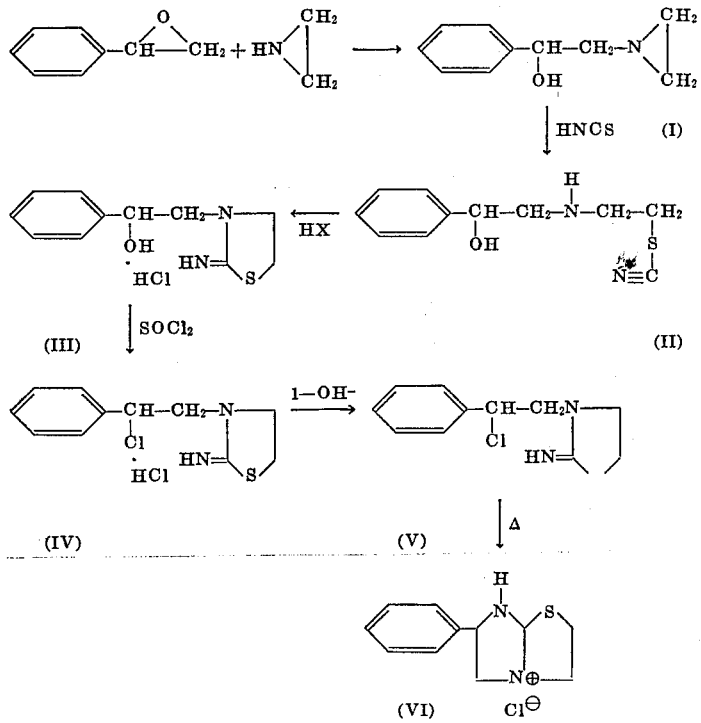

The preparation of Compound (I) has been described by Funke et al. as hereinbefore indicated. In accordance with the process of the invention, this compound can then be transformed into the compound of formula (II) by reaction thereof with about 1 mole equivalent of thiocyanic acid which can be prepared by the acidification of any ammonium or metal thiocyanate salt, with hydrochloric acid. When the compound of formula (II) is treated with about 1 molar equivalent of a strong acid, such as hydrochloric, it is immediately converted to the 2-iminothiazolidine alcohol of formula (III). The formation of (III) from (II) occurs rapidly at pH 1.5–3. The formation of both (II) and (III) are preferably carried out in a lower alkanol of one to four carbon atoms. The compound (III) can then be converted to compound (IV) by contacting (III) with thionyl chloride or other halogenating agent such as phosphorus trichloride or phosphorus oxychloride, which are known to transform alcohols to halides. This reaction is run at a temperature between 40° and 120° C. When the compound (IV) is contacted with a base, at a temperature below about 40° C., it is immediately transformed into the free base represented by formula (V). When this free base is heated to a temperature between about 40° and 120° C. in a solvent in the absence of base, it is isomerized to yield directly 6-phenyl-2,3,5,6-tetrahydroimidazo-[2,1-b]thiazole hydrochloride (VI).

The compound of the present invention was tested by standard parasitological procedures for evaluating anthelmintic efficacy, i.e., (1) in most cases the "critical" test in which the number of worms eliminated in the feces following treatment is compared with the total number of worms present, i.e., the sum of those eliminated and those present at necropsy, and (2) the "controlled" test method in which the average numbers of worms present in treated animals is compared at necropsy several days after treatment with the average number present in similarly infected but untreated animals. Depending upon the host species and the particular helminth studied the infections were experimentally induced or in some cases naturally acquired. The tests showed that dl-2,3,5,6-tetrahydro-6-phenyl-imidazo[2,1-b]thiazole hydrochloride is highly active against a very broad spectrum of nematode parasites of mammals and birds at low dosages and by varied routes of administration. The following Table gives illustrative representative results obtained in testing the above described imidazothiazole, and is not intended to be limiting in regard to dose ranges, routes of administration, or species of nematodes. Data refer to adult helminths unless otherwise indicated.

TABLE

| Doses mg./kg. (or other) | Route of administration | Approximate percent average efficacy | Species of adult [a] nematode |
|---|---|---|---|
| Mouse: | | | |
| 100 | Oral gavage | 100 | Syphacia, Aspiculuris. |
| 25 | do | 95–100 | Nematospiroides dubius. |
| 20 | Subcutaneous | 80 | Nematospiroides dubius. |
| (0.1% in feed) | Drug-diet | 90 | Ascaris suum larvae. |
| | | 100 | N. dubius. |
| Sheep: | | | |
| 3.75–10 | Oral drench | 100 | Haemonchus contortus. |
| 3.75–10 | do | 85–99 | Nematodirus sp. |
| 5–10 | do | 90–100 | Trichostrongylus axei. |
| 10 | do | 94 | Ostertagia circumcincta. |
| 15 | do | 100 | Ostertagia circumcincta. |
| 7.5–10 | do | 95 | Trichostrongylus colubriformis and T. vitrinus. |
| 2.5–7.5 | Subcutaneous | 100 | H.c. |
| 5–7.5 | do | 95 | O.o. |
| 2.5–7.5 | do | 99 | T.c. and T.v. |
| 5–7.5 | do | 97–100 | Nematodirus sp. |
| 15 | Oral drench | 99 | H.c. larvae. |
| 15 | do | 99 | T.c. larvae. |
| 15 | Subcutaneous | 87 | O.c. larvae. |
| Cattle: | | | |
| 2.5–10 | Oral drench | 100 | Haemonchus placei. |
| 7.5–20 | do | 80–100 | T. axei. |
| 7.5–20 | do | 80–100 | Ostertagi sp. |
| 5–10 | do | 100 | Cooperia sp. |
| 7.5 | do | 100 | Nematodirus sp. |
| 5–10 | do | 100 | Oesophagostomum sp. |
| 5–10 | Intramuscular or subcutaneous | 100 | H.p. |
| 5–20 | do | 90+ | T. axei. |
| 5–20 | do | 90+ | Ostertagia sp. |
| 5–10 | do | 100 | Cooperia sp. |
| 5–10 | Intramuscular | 100 | Nematodirus sp. |
| 5–10 | do | 100 | Oes. sp. |
| 5–10 | do | 100 | Bunostomum sp. |
| 7.5 | do | 100 | H.p. |
| 7.5 | Intraperitoneal | 80 | T. axei. |
| 7.5 | do | 90 | Ostertagia sp. |
| 7.5 | do | 100 | Cooperia sp. |
| 7.5 | do | 100 | Nematodirus sp. |
| 7.5 | do | 100 | Bunostomum sp. |
| Swine: | | | |
| 5 | Oral capsule or feed | 100 | Ascaris suum. |
| 10 | In drinking water | 100 | Ascaris suum. |
| 2.5–10 | In drinking water or oral capsule | 100 | Metastrongylus sp. |
| 10–20 | In drinking water | 85 | Oesophagostomum sp. |
| (0.0125% in feed) | In feed continuously | 95 | Ascaris suum larvae. |
| Dog: | | | |
| 5 | Subcutaneous | 99 | Ancylostoma caninum. |
| 10 | Oral capsule | 90 | Toxacara canis. |
| 10 | do | 100 | Toxascaris leonina. |
| Chicken: 80 | In drinking water | 90+ | Ascaridia galli larvae. |

[a] Unless otherwise indicated.

DETAILED DESCRIPTION

The following examples describe in detail the preparation of intermediates and final product of this invention.

EXAMPLE 1 dl α-Phenyl-1-Aziridineethanol

To a solution of 43.0 grams (1.0 mole) of ethyleneimine and 60.0 grams (0.5 mole) of styrene oxide is added 3 drops of water and 0.2 grams of potassium hydroxide. The mixture is heated at reflux for 1 ½ hours. Distillation of the crude product gives 55.6 grams (68%) of the crystalline product. Recrystallization gives pure α-phenyl-1-aziridineethanol with melting point 74°–76° C.

EXAMPLE 2 dl α-Phenyl-1-Aziridineethanol

A solution of 60.0 grams (0.5 mole) of styrene oxide, 50 ml. of ethanol, and 0.2 grams of potassium hydroxide is prepared. To this solution is added 25.9 grams (0.6 mole) of ethyleneimine in portions. The mixture is maintained at 29°–30 C. for 20 minutes, and then is heated at reflux for 30 minutes. The solvent is removed under reduced pressure to provide the crude product. Addition of petroleum ether to the residue gives 8.5 grams of product with melting point 53°–63° C. Distillation of the remaining oil gives an additional 30.7 grams of product, melting point 56–65° C., the total yield is 48%.

EXAMPLE 3 dl α-Phenyl-1-aziridineethanol

To 387.6 g. (9.0 moles) of stirred refluxing ethylenimine is added 360.5 g. (3.0 moles) of styrene oxide by a calibrated pump over a period of 171 minutes. After 5 hours of reflux the ethyleneimine is evaporated at reduced pressure to give 486.6 g. of a viscous residue. Distillation at 0.35 mm. gave 388.55 g. (79%) of oily crystals in 3 fractions: 3.05 g., boiling point 25°–105° C., melting point 56°–71° C.; 182.7 g., boiling point 98°–105° C., melting point 57°–73° C.; 202.8 g., boiling point 98° C., melting point 57°–71° C. (lit. (4) boiling point 116°–117°/0.06 mm., melting point 73° C.). The melting points are determined on crystals dried on filter paper.

EXAMPLE 4 dl 2-Imino-α-Phenyl-3-Thiazolidineethanol Hydrochloride

To a solution of 1.17 grams (0.012 mole) of potassium thiocyanate in 10 ml. of ethanol is added 0.011 mole of hydrogen chloride in 3 ml. of ethanol. The mixture is warmed to 50° C., cooled, and the precipitated potassium chloride filtered off. The filtrate, which contains 0.011 mole of thiocyanic acid, is added to a solution of 1.63 grams (0.01 mole) of α-phenyl-1-aziridineethanol at a rate sufficient to maintain the reaction temperature at 30°–35° C. After the addition of the thiocyanic acid is complete, the product dl 2-[(β-hydroxyphenethyl)amino]-ethyl thiocyanate is treated with a solution of 0.015 mole of hydrogen chloride in 5 ml. of ethanol. Removal of the solvent at a reduced pressure gives the product, melting point 196°–199° C., in a 95% yield. Recrystallization from ethanol provides the pure product, with melting point 198°–200° C.

EXAMPLE 5 dl 2-Imino-α-phenyl- 3-triolzolidineethanol Hydrochloride

To a solution of 87.2 g. (1.1 mole) of sodium thiocyanate in 1,700 ml. of isopropanol is added 163.2 g. (1.0 mole) of α-phenyl-1-aziridineethanol in 700 ml. of isopropanol and 163 ml. of 12 N hydrochloric acid during 0.5 hr., while maintaining the apparent pH of 1.5–3.0 as read with a glass electrode of a pH meter. After an additional 20 minutes, 20 ml. of 12 N hydrochloric acid (total of 2.2 moles) is added. The mixture is filtered and air dried to give 269 g. of sodium chloride and product. Concentration of the filtrate gives 68.8 g., melting point 199°–201° C. of the pure crystalline product. The salt contaminated product is treated with 150 ml. of water, filtered, washed with ether and dried to give 109.1 g. of product, melting point 203°–205° C. A total of 177.9 g. (69%, based on axiridine) of product is obtained.

EXAMPLE 6 dl 2-Imino-α-phenyl-3-thiazolidineethanol Hydrochloride

The crude product from the reaction of 1.0 mole of ethylenimine with 0.50 mole of styrene oxide is divided into 2 equal portions. From one a total of 23.95 g. (58%) of crystalline α-phenyl-1-aziridineethanol is obtained by vacuum distillation. The other half is reacted with thiocyanic acid without purification.

A warm mixture of 26.7 g. (0.275) mole) of potassium thiocyanate in 250 ml. of ethanol is treated with 53 g. of a methanolic solution of hydrogen chloride (0.25 mole). The precipitated potassium chloride is filtered, and washed with ethanol to provide the thiocyanic acid solution.

To the stirred solution of thiocyanic acid is added a solution of the crude α-phenyl-1-aziridineethanol in 250 ml. of ethanol at a rate sufficient to keep the reaction temperature at 30°–35° C. After the aziridine addition is complete, 72 g. of a methanolic solution of hydrogen chloride (0.35 mole) is added and the solution stirred for 1.5 hours at room temperature. An additional 0.05 mole of hydrogen chloride in 10 g. of ethanol is added, and the reaction heated at 35°–40° C. for 0.5 hour. It is then allowed to proceed at room temperature for 2.5 days. Essentially no change is evident (by infrared) from the further reaction at room temperature, but crystallization of the product did occur. The mixture is concentrated at reduced pressure to ca. 100 ml., filtered, washed with ethanol and dried to give 27.1 g. of white crystals, melting point 198°–200° C. The yield is 42% (based on styrene oxide) or 71% (based on dl α-phenyl-1-aziridineethanol).

EXAMPLE 7 dl 3- 3-(β-Chlorophenethyl)-2-Iminothiozoladine Hydrochloride

To a solution of 2.25 grams (0.009 mole) of 2-imino-α-phenyl-3-thiazolidineethanol hydrochloride in 50 ml. of chloroform is added 3 ml. of thionyl chloride. The mixture is refluxed for 30 minutes, and the solvent removed under pressure to give 1.93 grams of solid product.

EXAMPLE 8 dl 3-(β-Chlorophenethyl)-2-Iminothiazolidine Hydrochloride

To a stirred slurry of 40.0 g. (0.154 mole) of 2-imino-α-phenyl-3-triazolidineethanol hydrochloride and 62 ml. of methylene chloride is added 17 ml. (28.4 g., 0.238 mole) of thionylchloride over a period of 2–3 minutes (a brief, slightly exothermic reaction occurred). After 45 minutes at room temperature the reaction is complete, as shown by thin layer chromatography (TLC) with acetonitrile:ammonium hydroxide 98:2 (v/v). The reaction mixture, a very thick slurry, is filtered, washed with methylene chloride and ether, and dried. The crude product weighs 39.0 g. (91%), melting point 178°–182° C. and ca. 240°. Recrystallization of the product from ethanol gives 25.3 g. (59%) of white crystals, melting point 245°–246° C.

EXAMPLE 9 dl 2-Phenyl-2,3,5,6-Tetrahydroimidazo[Tetrahydroimidazo [2,1-b]thiazolium Chloride One gram (0.036 mole) of 3-(β-chlorophenethyl)-2-iminothiazolidine hydrochloride is partitioned between 50 ml. of ethylacetate and a solution of 2.34 g. (0.017 moles) of potassium carbonate in 32 ml. of water. The ethylacetate layer is separated and heated at reflux temperature for 2 ½ hours. The precipitate of 6-phenyl-2,3,5,6-tetrahydroimidazo[2,1-b]-thiazolium chloride is collected by filtration and recrystallized from absolute ethanol to yield 0.3 g. of pure product, melting point 257°–259° C.

EXAMPLE 10 dl 6-Phenyl-2,3,5,6-tetrahydroimidazo[2,1-b]thiazolium Chloride

To a mixture of 1.38 g. (5.0 mmoles) of 3-(β-chlorophenethyl)-2-iminothiazolidine hydrochloride (IV) in 20 ml. of water and 25 ml. of methylene chloride is added a solution of 1.38 g. (10 mmoles) of potassium carbonate in 5 ml. of water. The mixture is shaken, the layers separated, and the combined organic layers are washed with water and dried over magnesium sulfate. Removal of the solvent under reduced pressure gives a yellow oil. It is dissolved in 60 ml. of ethanol and heated at reflux for 45 minutes, then allowed to stand at 25° C. for 0.5 hours. Evaporation of the solvent at reduced pressure, and treatment of the residue with ether gives 1.17 g. (94%) of light yellow crystals, melting point 249°–254° C.

I claim:

1. A method for the preparation of dl 6-phenyl-2,3,5,6-tetrahydroimidazo[2,1-b]thiazole hydrochloride comprising the steps of (1) admixing dl 3-(β-chlorophenethyl)-2-iminothiazolidine hydrochloride with an alkali metal or alkaline earth metal hydroxide or carbonate in water and a water immiscible organic solvent selected from the group consisting of chlorinated hydrocarbons, lower alkyl esters and alkylene halides while maintaining the temperature of said mixture below about 40° C., (2) separating the organic phase from the thus formed mixture, (3) removing the solvent while maintaining the temperature below about 40° C., (4) dissolving the residue obtained from the above separation in a lower alkyl alcohol having from one to four carbons atoms, (5) heating the thus formed solution to a temperature of from about 40° to 120° C. for about 10 minutes to 3 hours and (6) separating the lower alkyl alcohol from said reaction mixture to give the product.

2. A method according to claim 1, where in the water immiscible organic solvent of step (1) is selected from the group consisting of chloroform, methylene chloride, ethylene chloride and ethyl acetate and wherein the lower alkyl alcohol step (4) is selected from the group consisting of methanol and ethanol.

3. A method according to claim 1, wherein the water immiscible organic solvent is selected from the group consisting of methylene chloride and ethylene chloride and the lower alkyl alcohol is ethanol.

4. A method for preparing dl 6-phenyl-2,3,5,6-tetrahydroimidazo[2,1-b]thiazole hydrochloride comprising the steps of (1) heating styrene oxide with ethyleneimine in the presence of a polar solvent to obtain dl-α-phenyl-1-aziridineethanol, (2) treating said dl-α-phenyl-1-aziridineethanol with approximately an equal molar amount of thiocyanic acid or an alkali metal thiocyanate in the presence of an organic solvent and thereafter treating the thus prepared reaction mixture with from about 1-2 molar equivalents of hydrochloric acid to obtain dl 2-imino-α-phenyl-3-thiazolidineethanol hydrochloride, (3) treating the above said thiazolidineethanol hydrochloride with a chlorinating agent selected from the group consisting of thionyl chloride, phosphorus trichloride and phosphorus oxychloride at a temperature between about 40° to 120° C. for 5 minutes to 4 hours to obtain dl 3-(β-chlorophenethyl)-2-iminothiazolidine hydrochloride, (4) treating the latter hydrochloride with an aqueous solution of an alkali metal or alkaline earth metal hydroxide or carbonate and a water immiscible solvent selected from the group consisting of chlorinated hydrocarbons, lower esters and alkylene halides, and separating the organic phase, (5) removing the solvent while maintaining the temperature below about 40° C., (6) dissolving the residue obtained from the above separation in a lower alkyl alcohol having from one to four carbon atoms, and (7) heating said alcoholic solution to a temperature between about 40° to 120° C. to obtain dl 6-phenyl-2,3,5,6-tetrahydroimidazo[2,1-b]thiazole hydrochloride.

* * * * *